US010493978B2

(12) United States Patent
Haupt (10) Patent No.: US 10,493,978 B2
(45) Date of Patent: Dec. 3, 2019

(54) ELECTRIC DRIVE (71) Applicant: GKN Automotive Ltd., Redditch, Worcestershire (GB)

(72) Inventor: Jan Haupt, Kürten (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 0 days.

(21) Appl. No.: 16/083,789

(22) PCT Filed: Mar. 18, 2016

(86) PCT No.: PCT/EP2016/056070
§ 371 (c)(1),
(2) Date: Sep. 10, 2018

(87) PCT Pub. No.: WO2017/157479
PCT Pub. Date: Sep. 21, 2017

(65) Prior Publication Data
US 2019/0337505 A1 Nov. 7, 2019

(51) Int. Cl.
*B60W 10/02* (2006.01)
*B60W 20/20* (2016.01)
(Continued)

(52) U.S. Cl.
CPC ............ *B60W 20/20* (2013.01); *B60K 17/24* (2013.01); *B60W 10/02* (2013.01); *B60W 10/10* (2013.01);
(Continued)

(58) Field of Classification Search
None
See application file for complete search history.

(56) References Cited

U.S. PATENT DOCUMENTS

| 4,950,214 A | 8/1990 | Botterill |
| 5,484,033 A * | 1/1996 | Frank ............... B60K 17/35 180/245 |

(Continued)

FOREIGN PATENT DOCUMENTS

| AT | 007 740 U1 | 8/2005 |
| DE | 102 25 873 A1 | 3/2003 |

(Continued)

OTHER PUBLICATIONS

International Search Report and Written Opinion for PCT/EP2016/056070 dated Dec. 20, 2016 (12 pages; with English translation).

*Primary Examiner* — Justin Holmes
(74) *Attorney, Agent, or Firm* — Bejin Bieneman PLC (57) ABSTRACT

An electric drive for driving a driving axle of a motor vehicle comprises a housing assembly; an electric machine with a hollow shaft that is rotatingly supported around a rotational axis; a transmission unit with a transmission shaft that is rotatingly drivable by a motor shaft around a rotational axis parallel to the rotational axis; a double clutch unit with a clutch carrier rotatingly drivable by the transmission shaft around the rotational axis, and two plate packages; wherein the clutch carrier comprises a casing portion and two cover portions; two actuators that are arranged outside the clutch carrier; two force transmitting members for transmitting a force generated by the actuator to the plate packages, wherein the cover portions each comprise a plurality of circumferentially distributed through-apertures through which cams of the force transmitting members extend; and a control unit for controlling the actuators.

18 Claims, 2 Drawing Sheets

(51) Int. Cl.
  *B60K 17/24* (2006.01)
  *B60W 10/10* (2012.01)
  *B60K 6/26* (2007.10)
  *B60K 6/48* (2007.10)

(52) U.S. Cl.
  CPC .. *B60K 2006/262* (2013.01); *B60K 2006/266* (2013.01); *B60K 2006/4808* (2013.01)

(56) References Cited

U.S. PATENT DOCUMENTS

| | | | |
|---|---|---|---|
| 8,604,738 B2* | 12/2013 | Takizawa | B60L 1/06 |
| | | | 318/473 |
| 9,446,763 B2* | 9/2016 | Larkin | B60K 6/387 |
| 2008/0182695 A1* | 7/2008 | Showalter | B60K 17/02 |
| | | | 475/88 |
| 2009/0127954 A1 | 5/2009 | Seiichi | |
| 2014/0296028 A1 | 10/2014 | Joeng | |
| 2015/0119181 A1 | 4/2015 | Fox | |
| 2018/0106353 A1* | 4/2018 | Guarino | F16H 48/22 |

FOREIGN PATENT DOCUMENTS

| | | |
|---|---|---|
| DE | 10 2012 101 984 A1 | 9/2013 |
| EP | 1 281 560 A2 | 2/2003 |
| JP | 2010241178 A | 10/2010 |

\* cited by examiner

Fig. 1

ELECTRIC DRIVE

CROSS-REFERENCE TO RELATED APPLICATIONS

This application is a national stage of, and claims priority to, Patent Cooperation Treaty Application No. PCT/EP2016/056070, filed on Mar. 18, 2016, which application is hereby incorporated herein by reference in its entirety.

DESCRIPTION

An electric drive for a motor vehicle can be used as the only drive or it can be used as an additional drive together with an internal combustion engine, wherein the electro drive and the internal combustion engine can each drive the motor vehicle on its own or can jointly drive the vehicle by being superimposed. Such drive concepts are also referred to as hybrid drives.

From US 2015/0119181 an electric drive for driving the rear axle of a motor vehicle is known. The electric drive comprises an electric machine, a downstream reduction gearing which translates an introduced rotational movement from high speed to low speed, as well as a differential gearing downstream the reduction gearing, which distributes the introduced torque to two sideshafts for driving the vehicle wheels. The electric machine and the differential gearing are arranged coaxially relative to one another.

AT 007 740 U1 proposes an electric auxiliary drive for a motor vehicle axle which is not driven under normal driving conditions. The auxiliary drive comprises an electric motor, a reduction gearing and two controllable clutches that are each drivingly connected to an associated drive axle. The electric motor is arranged at a radial distance from the controllable clutches.

From DE 102 25 873 A1 a similar driving force distribution device for a hybrid vehicle is known. The device comprises in an embodiment an electric motor which is arranged at a radial distance from the two clutches. The two clutches are electromagnetically controllable. A shaft of the reduction gearing extends in parallel to and between the motor shaft of the electric motor and the rotational axes of the clutches.

JP 2010-241178 shows an electric drive with an electric motor, a reduction gearing and clutches arranged in a similar way.

From EP 1 281 560 A2 an axle model with two separate friction plate clutches is known. For the introduction of torque there is provided an angle drive which rotatingly drives a hollow shaft. The friction plate clutches are arranged at a distance from the ends of the hollow shaft.

From U.S. Pat. No. 4,950,214 a controllable locking differential is known. The locking differential comprises a friction plate clutch which can be operated by a ramp assembly and which is arranged between the differential carrier and a side shaft gear of the differential. The ramp assembly is arranged outside the differential carrier. The transmission of an axial force generated by the ramp assembly and to be transmitted to the multi-plate package arranged inside the differential carrier is effected by tappets which penetrate the differential carrier.

Known electric axle systems must be uncoupled at high driving speeds because of the maximum permissible rotational speed of the electric motor and the applied transmission ratio, wherein however undesirable remaining drag moments can remain at the axle. This may lead to a negative effect on the overall efficiency of the drive system, in particular at high speeds.

Because of the high system weight of the necessary units like battery, electric motor and inverter, the driving dynamics of a hybrid vehicle is clearly adversely affected as compared to conventionally driven (four wheel) vehicles, which, in the first place, results in in a higher degree of under-steering. Furthermore, vehicle traction can be limited if open differentials are used.

SUMMARY

The present disclosure includes an electric drive for driving a motor vehicle that permits a controlled distribution of torque to two axle shafts and which, at the same time features a simple and compact design.

An electric drive for driving a driving axle of a motor vehicle, comprises: a housing assembly; an electric machine having a motor shaft which is configured as a hollow shaft and which is supported in the housing assembly so as to be rotatable around a rotational axis; a transmission unit with a transmission shaft that is rotatingly drivable by the motor shaft, and that is supported in the housing assembly so as to be rotatable around a rotational axis extending parallel to the rotational axis; a double clutch unit having a clutch carrier rotatingly drivable by the transmission shaft, a plate package and a first clutch hub for driving a first output shaft, as well as a second plate package and a second clutch hub for driving a second output shaft, wherein one of the two output shafts extends through the hollow shaft of the electric machine; wherein the clutch carrier is rotatingly supported in the housing assembly coaxially relative to the rotational axis of the motor shaft and comprises a casing portion which forms a receiving chamber for the first and the second plate package, as well as a first cover portion and a second cover portion that laterally delimit the receiving chamber of the clutch carrier and each comprise a sleeve projection for supporting the clutch carrier in the housing assembly; a first actuator for loading the first plate package, wherein the first actuator is arranged outside the clutch carrier and is axially supported at the housing assembly in a first direction, wherein there is provided a first force transmitting member for transmitting an axial force generated by the actuator to the first plate package arranged in the clutch carrier, wherein the first cover portion comprises a plurality of circumferentially distributed first through-apertures through which cams of the first force transmitting member extend; a second actuator for loading the second plate package, wherein the second actuator is arranged outside the clutch carrier and is axially supported at the housing assembly in a second direction, wherein there is provided a second force transmitting member for transmitting an axial force generated by the actuator to the second plate package arranged in the clutch carrier, wherein the second cover portion comprises a plurality of circumferentially distributed second through-apertures through which cams of the second force transmitting member extend; wherein the first actuator and the second actuator are controllable independently of one another by a control unit, so that a first torque transmittable from the first plate package to the first clutch hub and a second torque transmittable from the second plate package to the second clutch hub can be variably set independently of one another.

An advantage of the electric drive is that the double clutch assembly permits a variable torque distribution to the two output shafts. There is no need for a differential gearing for distributing torque to the two output shafts. Depending on the driving conditions, the torque can be individually set at the curve inside wheel and the curve outside wheel respectively, which overall leads to improved driving dynamics and driving stability. This steering principle is also referred to an active torque distribution or "torque vectoring". A further advantage refers to the compact configuration of the electric drive.

Because of the specifically controllable distribution of torque between the vehicle wheels, the electric drive offers the possibility of active torque vectoring at the electrically driven driving axle, in particular the rear axle. When negotiating curves, the outer wheel is subjected to more torque than the inner wheel. Within the context of the driving-dynamic tuning of the motor vehicle, this can specifically be used to reduce the vehicle's unwanted tendency to understeer due to a positive yaw moment. Furthermore, the vehicle dynamics can be positively influenced due to a controlled difference of the rotational speed between the front axle and the electrically controlled rear axle. As a further function, the electric drive makes it possible to lock the driving axle. Similar to a locking differential, the two vehicle wheels can be connected to one another by synchronously controlling the clutches. This leads to a clearly improved traction and, in the upper speed range it can be used for yaw damping.

According to one possible embodiment, the clutch carrier, on is outer circumferential face, comprises an annular gear that engages an output gear of the transmission shaft. The annular gear can be fixed to the clutch carrier and, more particularly, can be integrally produced with the clutch carrier. In an embodiment, the annular gear and the output gear engaging same comprise helical teeth. By configuring the clutch carrier with side cover parts, the axial forces acting from the helical teeth on the clutch carrier can be passed on particularly well and can be axially supported against the housing.

According to an embodiment which is particularly advantageous for achieving a compact design, the transmission unit comprises exactly one transmission shaft and in particular two gear pairs. In this case, the input gear of the motor shaft, and the input gear of the transmission shaft engaging same, form a first gear pair. Furthermore, the output gear of the transmission shaft, and the annular gear engaging same, form the second gear pair. It is proposed in particular that a total transmission ratio of the transmission unit ranges between 8 and 10. For example, more specifically, a first transmission ratio of the first gear pair can be between 3.0 and 4.0 and a second transmission ratio of the second gear pair can be between 2.5 and 3.5. The reduction gearing is configured to feature a transmission ratio to reduced speed. Thus, the input part of the double clutch unit rotates many times slower than the motor shaft of the electric motor. The double clutch unit distributes the introduced torque to the two output shafts which serve to drive an associated vehicle wheel.

To achieve a compact design, it can be proposed in particular that a radial gap formed between the rotational axis of the transmission shaft and the rotational axis of the motor shaft is smaller than 0.9 times the greatest radius of the electric machine, in particular smaller than 0.8 times the radius. In this configuration the transmission shaft—in an axial view—is clearly within an envelope of the electric machine, so that overall a radially compact design of the electric drive is achieved.

In an embodiment a first clutch bearing is provided for supporting the first cover portion of the clutch carrier and a second clutch bearing for supporting the second cover portion of the clutch carrier, wherein an outer diameter of the first clutch baring is smaller than an inner diameter of the first actuator and/or wherein an outer diameter of the second clutch bearing is smaller than an inner diameter of the second actuator. In other words, at least one of the two clutch bearings is positioned radially inside the actuator associated with this side. This, in turn, makes it possible that the clutch bearing and the actuator, optionally, can be arranged with an axial overlap, which has an advantageous effect on the axial space. It is possible that the first clutch bearing at least partially axially overlaps with the first actuator and/or the second clutch bearing at least partially axially overlaps with the second actuator.

As far as the configuration of the actuators is concerned, there exist various technical possibilities, for example actuators that are operated hydraulically, electromotive or electromagnetically. The first and second actuators for operating the first and the second clutch can be configured identically in respect of their structure and function. If, within the context of the present disclosure, only one actuator is described, such features automatically also apply to the other actuator. Of course this also applies to other technical components of which there are provided two.

If the first and/or the second actuator are provided in the form of a hydraulically operated actuator, it can comprise an annular piston which is displaceably arranged in an annular cylinder chamber of the housing assembly, wherein an axial bearing can be arranged between the annular piston and the first operating member.

According to an alternative embodiment, the first and/or the second actuator can be configured in the form of an electrically actuatable ramp assembly and can comprise an axially supported supporting ring and an axially movable setting ring. In this case it is proposed in particular that one of the two rings is held in the housing assembly in a rotationally fixed way, with the other one of the two rings being rotatingly drivable. The two rings are axially supported relative to one another via ramp faces, optionally with rolling members being arranged therebetween, wherein the ramp faces are configured such that a rotation of the one ring relative to the other ring results in an axial displacement of the setting ring relative to the supporting ring. Between the setting ring and the associated actuating member of the clutch package an axial bearing can be provided which can be configured in the form of an axial needle bearing for example.

The housing assembly of the electric drive can have a multi-piece design made of individual housing parts that can be connected to one another by flange connections, for example. More specifically, the housing assembly can comprise a first housing portion that at least partially form a first receiving chamber for the electric machine, a second housing portion that at least partially forms a second receiving chamber for the double clutch unit, as well as at least one intermediate wall that is arranged between the first housing portion and the second housing portion. The formulation "at least partially form a receiving chamber" means that the respective unit can be received partially, largely, or completely in the respective receiving chamber. The intermediate wall can comprise a first bearing receiving face for receiving a first shaft bearing for the motor shaft as well as a second bearing receiving face for receiving a second shaft bearing for the transmission shaft, wherein it is proposed in particular that a radial distance between the first bearing receiving face and the second bearing receiving face is smaller than 2.0 times the radial extension of the first and/or the second shaft bearing, in particular smaller than 1.0 times the radial extension.

Furthermore, the housing assembly can comprise an intermediate plate that is arranged between the intermediate wall and the second housing portion. One of the two clutch bearings and one of the two actuators can be received in the intermediate plate and/or axially supported against same. Because of this configuration, the axial forces introduced by the meshing engagement between the transmission shaft and the clutch carrier can be well supported and introduced into the housing.

Further it is proposed that, between the intermediate wall and the intermediate plate, which can also be referred to as the second intermediate wall, a receiving chamber is formed. The transmission shaft can be rotatably supported in a bearing portion of the intermediate wall, wherein the input gear of the transmission shaft is arranged so as to axially adjoin same in the receiving chamber. According to a possible embodiment the hollow shaft comprises a shaft portion connected to a rotor of the electric machine, a bearing portion rotatably supported in the intermediate wall and the input gear. The input gear can be formed at a free end of the hollow shaft or firmly connected to same in a different way, and can freely project into receiving chamber formed between the intermediate wall and the intermediate plate.

A particular challenge with respect to a compact arrangement is the oiling of the electric drive.

According to an embodiment an annular channel can be formed between the hollow shaft and the output shaft extending through the hollow shaft, with a first mouth facing the transmission unit and a second mouth remote from the transmission unit. The intermediate plate of the housing assembly can comprise a through-opening through which the output shaft extends, wherein an annular gap is formed between the output shaft and the intermediate plate. A lubricant can flow from the receiving chamber of the double clutch unit into the annular channel in order to reach from there to remotely arranged rotating components of the electric drive.

The intermediate wall can comprise a sleeve projection coaxially relative to the rotational axis and extending in the axial direction, which engages an end recess of the hollow shaft with an axial overlap. The sleeve projection and the hollow shaft can overlap in the axial direction while forming a small gap. As a result of the axial overlap of the sleeve projection and the end recess of the hollow shaft, a labyrinth seal is formed that prevents lubricant flowing towards the annular channel through a gap formed between the stationary sleeve projection and the rotating hollow shaft from escaping radially outwardly prior to reaching the annular channel.

The output shaft extending through the hollow shaft comprises a second end portion which is remote from the transmission unit and which is supported in the bearing receiving part of the housing assembly by a shaft bearing so as to be rotatable around the rotational axis. The hollow shaft can extend axially as far as and into the bearing receiving part, i.e., the end portion of the hollow shaft axially overlaps with the bearing receiving part. The rotatingly drivable hollow shaft is sealed relative to the stationary bearing receiving part by a rotary seal that can be configured as a radial shaft seal. In an embodiment, the end-facing end of the hollow shaft, i.e., outlet end of the annular channel is arranged axially between the rotary seal and the shaft bearing of the output shaft, so that said components are well-lubricated. The shaft bearing can be laterally adjoined by a further rotary seal which seals the annular space between the output shaft and the bearing receiving part.

SUMMARY OF THE DRAWINGS

Exemplary embodiments will be explained below with reference to the drawing, wherein FIG. 1 diagrammatically shows an example electric drive in a longitudinal section.

DESCRIPTION

Figure 1:
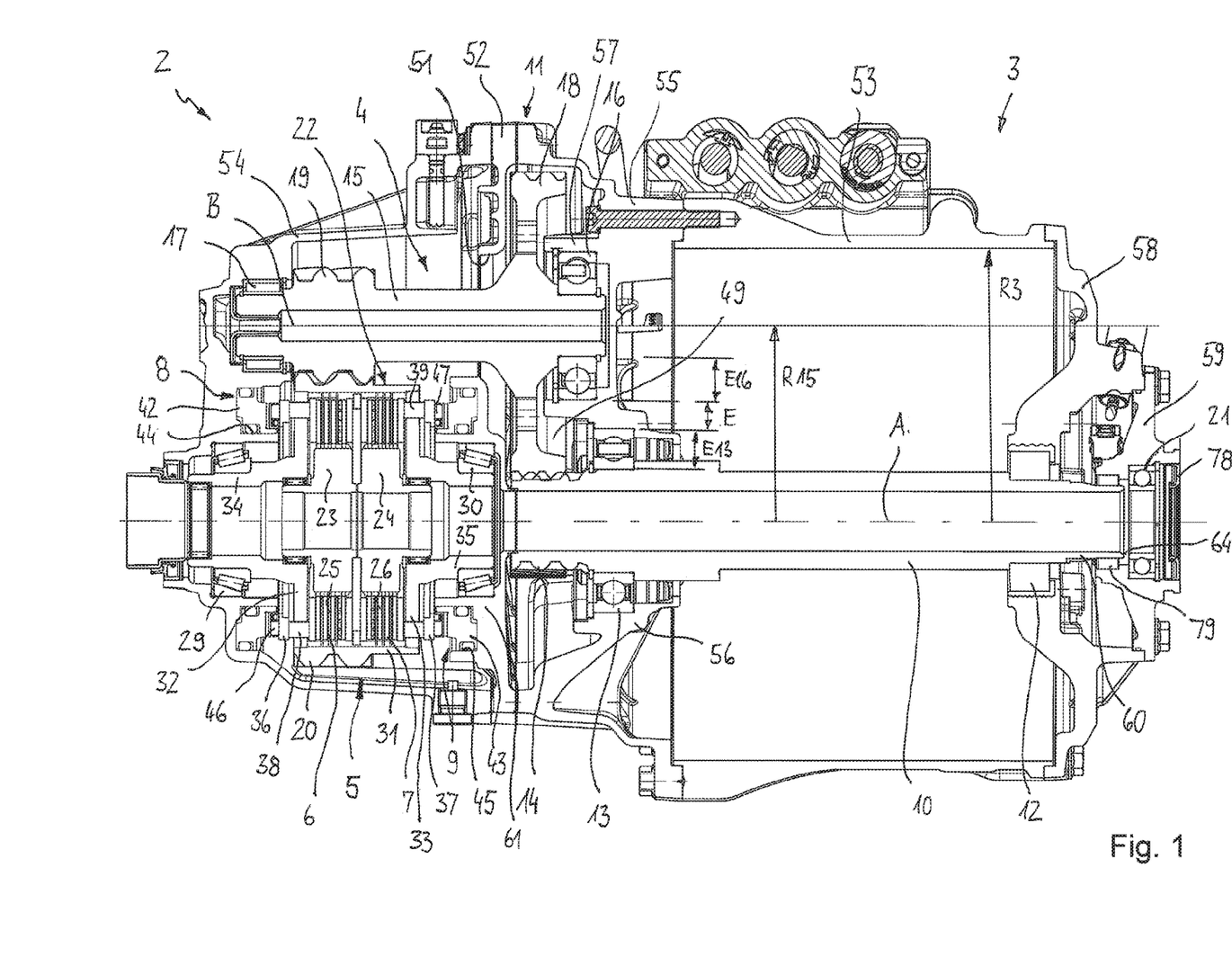
Figures 2, 3:
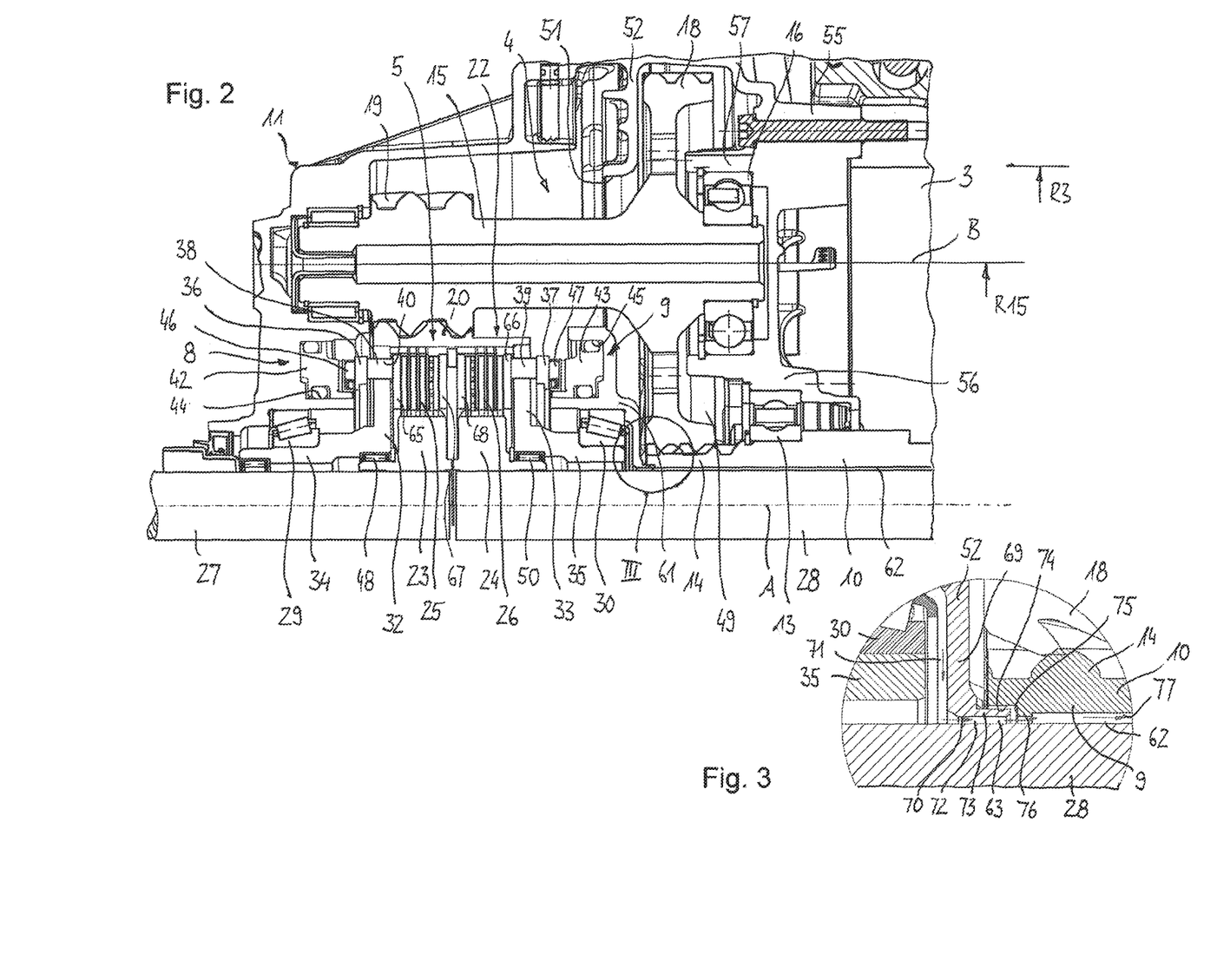
FIG. 2 is a detail of the electric drive of FIG. 1 in an enlarged illustration.
FIG. 3 shows the mouth region of FIG. 2 in the form of a detail in an enlarged illustration.

FIGS. 1 to 3 will be described jointly below. FIG. 1 shows an example electric drive 2 with an electric machine 3 and a transmission unit 4 rotatingly drivable by the electric machine 3 as well as a double clutch unit 5 rotatingly drivable by the transmission unit 4 with two separately controllable friction clutches 6, 7, each operable by an associated actuator 8, 9.

The electric drive 2 is configured for driving a driving axle of a motor vehicle as the only drive of said driving axle. A further driving axle of the motor vehicle can be driven by a further drive unit with a separate drive source, for instance an internal combustion engine. However, there are no mechanical driving connections between the two drives systems.

The electric machine 3 comprises a stator and a rotor rotatable relative thereto which, when the electric machine is supplied with current, rotatingly drives a motor shaft 10. The rotational movement of the motor shaft 10 is transmitted via the transmission unit 4 arranged downstream in the power path to the double clutch unit 5. The electric machine 3 is supplied with electric current by a battery (not shown). The electric machine 3 can be operated in the motor mode, with electric energy being converted into mechanical energy for driving the driving axle or, in a generator mode, wherein, vice-versa, mechanical energy is converted into electrical energy which is then stored in the battery. Furthermore, the electric drive 2 comprises a housing assembly 11 in which the electric machine 3, the transmission unit 4 and the double clutch unit 5 are arranged.

The transmission unit 4 is configured in the form of a reduction gearing which translates a rotational movement introduced by the motor shaft 10 from high speed to low speed. Thus, the input part of the double clutch unit 5 rotates multiple times slower than the motor shaft 10 of the electric machine 3. The double clutch unit 4 divides the introduced torque among the two sideshafts 27, 28 that serve to drive an associated vehicle wheel. The motor shaft 10 is configured as a hollow shaft and supported by bearings 12, 13 so as to be rotatable in the housing assembly 11 of the electric drive 2 around a rotational axis A. A drive gear 14 (first gear) is connected in a rotationally fixed manner to the driveshaft 10, in particular, so as to be integral therewith.

The reduction gearing 4 comprises a transmission shaft 15 that is rotatingly supported in the housing assembly 11 around a second rotational axis B extending parallel to the first rotational axis A and that can also be referred to as intermediate shaft. The transmission shaft 15 comprises an input gear 18 (second gear) and an output gear 19 (third gear) which are connected to the transmission shaft 15 in a rotationally fixed way, in particular are integrally formed therewith. The output gear 19 engages the annular gear 20

(fourth gear) for driving the double clutch unit 5. The annular gear 20 is connected to the input part 22 of the double clutch unit 5 and can, for example, be integrally formed therewith, wherein other connections such as a material-locking connection by welding and/or a force-locking connection by bolts are also possible. It is proposed that the output gear 19 of the shaft 15 and the annular gear 20 of the clutch input part comprise helical teeth.

It can be seen that the reduction gearing 4 comprises exactly one transmission shaft 15 and two gear pairs. The input gear 14 of the motor shaft 10 and the input gear 18 of the transmission shaft 15 meshing therewith form a first gear pair of the transmission 5 with a first transmission ratio i1. The output gear 19 of the transmission shaft 15 and the annular gear 20 engaging same form a second gear pair i2. The motor shaft input gear 14 comprises a much smaller diameter and/or a smaller number of teeth than the diameter and/or a smaller number of teeth than the transmission shaft input gear 18. Thus, a transmission from high speed to low speed is achieved. Equally, the transmission shaft output gear 19 comprises a smaller diameter and/or a smaller number of teeth than the annular gear 20, so that there is achieved a further transmission to slow. The reduction gearing 4 is configured in particular in that a total transmission ratio between the motor shaft 10 and the clutch input part 22 ranges between 8.0 and 10.0. For example, in a specific embodiment, the first transmission ratio i1 of the first gear pair 14, 18 is between 3.0 and 4.0 and the second transmission ration i2 of the second gear pair 19, 20 is between 2.5 and 3.5.

From a structural point of view, the intermediate shaft 15 is arranged relatively close to the motor shaft 10. More particularly it is proposed that the radial distance R15 formed between the rotational axis B of the transmission shaft 15 and the rotational axis A of the motor shaft 10 is smaller than 0.9 times the greatest radius R3 of the electric machine 3, in particular smaller than 0.8 times the radius R3. In this embodiment, the transmission shaft 15 (excluding the input gear 18) in an axial view is clearly inside the envelope of the electric machine, so that, overall, a radially compact design of the electric drive is achieved.

The double clutch unit 5 comprises, as an input part, a clutch carrier 22 that is rotatingly drivable by the transmission shaft 15, and two clutch hubs 23, 24 as clutch output parts to which, via a respective plate package 25, 26, torque can be transmitted from the clutch carrier 22 to the respective clutch hub 23, 24. The clutch packages 25, 26 each comprise outer plates connected to the clutch carrier 22 in a rotationally fixed and axially movable manner, as well as inner plates connected to the clutch hub 23, 24 in a rotationally fixed and axially moveable manner, that are arranged so as to axially alternate. In respect of design, more particularly geometric dimensions such as outer hub diameter, inner hub diameter, diameter of the outer and inner plates, the two clutches are configured identically. The first clutch hub 23 is drivingly connected to the first output shaft 27 and the second clutch hub 24 is drivingly connected to a second output shaft 28. It can be seen in FIG. 2 that the second output part 28 extends through the hollow shaft 10 of the electric machine 3. The double clutch unit 5 is arranged coaxially relative to the electric machine 3. Specifically, the clutch carrier 22 is rotatably supported by two clutch bearings 29, 30 in the housing assembly 11 coaxially relative to the rotational axis A of the motor shaft 9.

The clutch carrier 22 comprises a casing portion 31 that can also be referred to as a sleeve portion or cylindrical portion, as well as two cover portions 32, 33 connected to the casing portion and laterally delimiting same. According to the present example, the clutch carrier is configured in three parts, wherein the casing portion 31 as well as the cover portions 32, 33 are produced as separate parts and are subsequently firmly connected to one another, in particular by welding. To that extent, the casing portion 31 can also be referred to as a casing part and the cover portions 32, 33 as the cover parts. The cover portions 32, 33 each comprise an integrally formed on sleeve projection 34, 35 for receiving an associated clutch bearing 29, 30 by means of which the clutch cage is rotatably supported in the housing 11.

Each of the two clutches 6,7 can individually be operated by an associated actuator 8, 9. For this purpose, the two actuators 8, 9 can be independently controlled by a control unit (not shown), so that a first torque transmittable by the first plate package 26 to the first clutch hub 23 and a second torque transmittable by the second plate package 26 can be variably set independently of one another. In respect of their design and mode of functioning, the two actuators 8, 9 are identical, which is the reason why they will be described jointly below. All features described for one actuator accordingly also applies for the other actuator. The two actuators 8, 9 are each arranged outside the clutch carrier 22 and are axially supported on the housing arrangement 11 in opposite axial directions.

Per clutch 6, 7 there is provided a force transmitting member 36, 37 for transmitting an axial force generated by the actuator to the associated plate package 25, 26 arranged in the clutch carrier 22. The force transmitting members 36, 37 comprise a disc-shaped base member from which a plurality of cams 38, 39 project in an axial direction, which cams can also be referred to as projections. The two cover portions 32, 33 each comprise a plurality of circumferentially distributed axial through-apertures 40, 41 through which the cams 38, 39 of the associated force transmitting members 36, 37 extend. The cams 38, 39 are each firmly connected to the respective disc-shaped base member, and are configured to be integral therewith, for example by means of a forming technique. The force transmitting members 36, 37 are connected to the clutch carrier in a rotationally fixed way via the cams 38, 39 engaging the apertures of the cover parts, so that they jointly rotate with same around the rotationally axis A. At the same time, the force transmitting members 36, 37 are axially movable relative to the clutch carrier 22 to transmit an axial setting force of the actuators positioned outside the clutch carrier 22 to the plate packages 25, 26 arranged in the clutch carrier 22. The cams 38, 39 each act on a pressure plate 65, 66 arranged in the clutch cage 22, that transmits the force to the respective plate package 25, 26. On the axial inside, the plate packages 25, 26 are each axially supported via a supporting plate 67, 68 against a securing ring connected to the clutch carrier 22.

In the present embodiment, the actuators 8, 9 are configured as hydraulically operable actuators, and each comprises an annular piston 42, 43 that is axially displaceably positioned in an associated annular cylinder chamber 44, 45 of the housing assembly 11. A hydraulic pressure can be generated by a hydraulic pump in the hydraulic chamber via oil channels (not shown), so that the piston 42, 43 positioned therein is axially moved towards the clutch carrier 22. An axial force is transmitted via an axial bearing 46, 47 to the respective force transmitting member 36, 37. The axial bearings 46, 47 serve to rotationally decouple the force transmitting members 36, 37 rotating with the clutch carrier 22 relative to the actuators and respectively pistons 42, 43 fixedly arranged in the housing 11. For returning the actuators 8, 9, returning springs, not illustrated here, can be provided. For example, they can be arranged between the clutch carrier 22 and the associated force transmitting member 36, 37 to load same axially away from the associated force transmitting member 36, 37 when the actuator is not operated.

The actuators 8, 9 are arranged radially outside the two clutch bearings 29, 30, i.e., an outer diameter of the first and respectively second clutch bearings 29, 30 is smaller than an inner diameter of the first and respectively second actuator 8, 9. As compared to the bearings 29, 30, the plate packages 25, 26 are positioned on a relatively large diameter. Specifically, it is proposed that a smallest inner diameter of the first and/or second plate package 25, 26 is greater than a greatest outer diameter of an inner bearing ring of the first and/or second clutch bearing 29, 30. Furthermore, a mean diameter of the plate packages 25, 26 is greater than a greatest diameter of the first and/or second bearing 29, 30. In particular, the two bearings 29, 30 are configured as bevel roller bearings, so that they can support axial forces very well and introduce same into the housing 11. The force transmitting members 38, 39 acting on the plate packages 25, 26 are positioned at least largely radially outside the mean diameter of the plate packages 25, 26. Furthermore, it is proposed that the first clutch bearing 29 at least partially axially overlaps with the first actuator 8 and/or that the second clutch bearing 30 at least partially axially overlaps with the second actuator 9.

The first clutch hub 23 is connected to the first output shaft 27 in a rotationally fixed way, which can transmit introduced torque via a constant velocity joint to a first sideshaft (not shown). The second clutch hub 24 is connected to the second output shaft in a rotationally fixed way. The two clutch hubs 23, 24 are axially supported against each other and relative to the clutch carrier 22. The output shaft 28, has a transmission-sided first end portion 37 that is connected to the clutch hub 24 in a rotationally fixed way. The clutch hubs 23, 24 are supported by bearings 48, 50 relative to the clutch carrier 22 so as to rotate around the rotational axis A. For this, the clutch hubs 23, 24 each comprise an axially outwardly projecting sleeve projection. Between an outer face of the sleeve projection and an inner face of the respective cover part 32, 33 there is positioned a respective bearing 48, 50. Furthermore, the output shaft 28 comprises an end portion which is remote from the transmission and which, by means of a bearing, is rotatably supported in the housing assembly 11 around the rotational axis A. A constant velocity joint can be connected the outer end portion which serves to transmit torque to a second sideshaft (not shown) of the motor vehicle while carrying out angular movements.

It can be seen in FIG. 1, that the housing assembly 11 is composed of a plurality of individual housing parts. More particularly, the housing assembly 11 comprises a first housing portion 53 that receives the electric motor 3 and a second housing portion 54 that receives the transmission unit 4, as well as a first intermediate wall 55 and a second intermediate wall 52 that are arranged between the first and the second housing portion 53, 54 and are firmly connected thereto. The first intermediate wall 55 comprises a first bearing receiving portion 56 in which the hollow shaft 10 is rotatingly supported by a bearing 13 around the rotational axis A, as well as a second bearing receiving portion 57 in which the transmission shaft 15 is rotatingly supported by the bearing 16 around the rotational axis B. It is proposed for example that a radial distance E between the first bearing receiving face and the second bearing receiving face is smaller than 2.0 times the radial extension E13, E16 of the first, respectively, the second shaft bearing 13, 16. This contributes towards achieving a radially compact design of the electric drive.

Axially between the first intermediate wall 55 and the second intermediate wall 52 a receiving chamber 49 is received that accommodates the input gears 14, 18. The second intermediate wall 52, that is narrower than the first intermediate wall 5 can to that extent also be referred to as an intermediate plate, comprises a bearing receiving portion 61 in which the bearing 30 is received for rotatably supporting the clutch carrier 22, as well as a through-aperture 51 through which the transmission shaft extends. The through-aperture 51 comprises a greater inner diameter than the outer diameter of the gear 19, so that the transmission shaft 15 with the gear 19 can be mounted through the aperture 51.

At its end remote from the transmission unit 4, the housing assembly 11 comprises a cover part 58 in which the bearing 12 for the hollow shaft 10 is received, as well as a bearing receiving part 59 connected thereto in which the bearing 40 for the output shaft 28 is received. The hollow shaft 10 comprises a first end portion 60 that is rotatably supported in the housing part 58 by the shaft bearing 12, a shaft portion that is connected to the rotor in a rotationally fixed way, a portion rotatably supported in the bearing receiving portion 56 of the first intermediate wall 55, and the input gear 14 that projects into the receiving chamber 49 formed between the two intermediate walls 52, 55.

As can be seen in particular in FIGS. 2 and 3, an annular channel 62 is formed between the hollow shaft 10 and the output shaft 28, which annular channel 62 comprises a first mouth 63 facing the transmission unit 4 and a second mouth 54 remote from the transmission unit. The housing assembly 11 can comprise a lubricant guiding geometry that is configured to guide lubricant from the transmission unit 4 into the mouth region of the first mouth 63. Thus, the lubricant can flow through the aperture formed between the hollow shaft 10 and the output shaft 28 and along the annular channel 62 to the second mouth 64. In this way it is possible to lubricate parts of the drive assembly 2 positioned remote from the transmission unit 4.

At its end facing the clutch carrier 22, the intermediate wall 52 can comprise a lubricant chamber in which lubricant can temporarily be received. On the radial interior a through-channel 71 is provided that with a first end is connected to the chamber and with a second end leads to a radial inner annular portion 69 of the intermediate wall 52. The direction of flow of the lubricant is indicated by arrows in FIG. 3.

The intermediate wall 52 comprises a though-aperture 70 through which the output shaft 28 extends. The inner diameter of the of the through-aperture 70 is greater than the outer diameter of the shaft 28 in this portion, so that between the shaft and the intermediate wall an annular aperture 72 is formed through which the lubricant can flow towards the hollow shaft 10 and the annular channel 62 respectively. It can be seen in particular in FIG. 3 that the intermediate wall 52, on its radial interior, comprises a sleeve projection 73 coaxially relative to the rotational axis A which extends in axial direction into an end recess 74 of the hollow shaft 10. The sleeve projection 73 comprises an outer diameter that is smaller than an inner diameter of the end recess 74. In the mounted condition, the sleeve projection 73 and the hollow shaft 10 overlap in the axial direction, wherein between the two components an L-shaped gap in half longitudinal section is formed. The gap 75 formed between the intermediate wall 52 and the hollow shaft 10 can have a width, for example, of between 0.1 and 0.5 millimetres. Because the sleeve projection 73 and the hollow shaft 10 axially engage one another, a labyrinth seal is formed so that the flow of lubricant moving through the gap between the sleeve projection 73 and the hollow shaft 10 is kept small. In this regard, the throttle effect generated by the gap 75 increased with an increasing length of the axial overlap between the sleeve projection 73 and the hollow shaft 10. For example, the axial overlap can range between 2.0 and 10 millimetres. Because of the axial overlap and respectively the fluid throttle effect generated in this way, a larger flow of lubricant passes through the gap 75 in the axial direction in order to reach the annular gap 63 formed between the hollow shaft 10 and the output shaft 28, and from there to reach the remote components to be lubricated.

At its end portion facing the intermediate wall 52, the hollow shaft 10 comprises a radially inwardly projecting collar which axially delimits the end recess and the gap 75, respectively. The collar 76 comprises an internal diameter that is smaller than the inner diameter of the recess 74 and smaller than the inner diameter of the portion of the hollow shaft 10 that axially extends towards the second mouth 64. To ensure a satisfactory supply of lubricant it is proposed in particular that the inner diameter of the collar 76 largely corresponds to the inner diameter of the sleeve projection 73, and/or that the annular gap between the sleeve projection 73 and the shaft 10 amounts to approximately the same size as the annular gap between the collar 76 and the shaft 10. Said annular gaps can be for example greater than 0.5 mm and/or smaller than 1.5 mm. The portion axially adjoining the collar 76 comprises a greater inner diameter than the inner diameter of the collar 76. The lubricant axially flowing past the collar 76 reaches a greater diameter in the annular channel 62 as a result of the centrifugal force. A lubricant column is formed at the inner wall 77 of the hollow shaft 10 can be axially supported on the collar 76, so that as a result of lubricant continuing on to flow past the collar 76 a flow of lubricant through the annular channel 62 to the remote end of the hollow shaft 10 is produced where the lubricant emerges from the mouth 64 and reaches the bearing 40 and the shaft seal 78.

LIST OF REFERENCE NUMBERS 2 electric drive
3 electric motor
4 transmission unit
5 clutch unit
6, 7 clutch
8, 9 actuator
10 motor shaft/hollow shaft
11 housing assembly
12,13 bearing
14 input gear (first gear)
15 transmission shaft
16,17 bearing
18 input gear (second gear)
19 output gear (third gear)
20 annular gear (second gear)
21 bearing
22 clutch carrier
23,24 clutch hub
25,26 plate package
27 first output shaft
28 second output shaft
29,30 clutch bearing
31 casting portion
32 cover portion
33 cover portion
34,35 sleeve projection
36,37 force transmitting member
38,39 cam
40,41 through-apertures
42,43 piston
44,45 cylinder chamber
46,47 axial bearing
48 bearing
49 receiving chamber
50 bearing
51 through-aperture
52 intermediate wall
53 first housing portion
54 second housing portion
55 cover part
56 first bearing receiving chamber
57 second bearing receiving chamber
58 cover part
59 bearing receiving part
60 end portion
61 bearing receiving portion
62 annular channel
63 first mouth
64 second mouth
65,66 pressure plate
67,68 supporting plate
69 annular portion
70 through-aperture
71 through-channel
72 annular aperture
73 sleeve projection
74 recess
75 gap
76 collar
77 inner wall
78 shaft seal
A rotational axis
B rotational axis

The invention claimed is:

1. An electric drive for driving a driving axle of a motor vehicle, comprising:
a housing assembly;
an electric machine having a motor shaft configured as a hollow shaft that is supported in the housing assembly so as to be rotatable around a rotational axis;
a transmission unit with a transmission shaft which is rotatingly drivable by the motor shaft, and which is supported in the housing assembly so as to be rotatable around a rotational axis extending parallel to the rotational axis;
a double clutch unit having a clutch carrier rotatingly drivable by the transmission shaft, a plate package and a first clutch hub for driving a first output shaft, as well as a second plate package and a second clutch hub for driving a second output shaft, wherein one of the two output shafts extends through the hollow shaft of the electric machine;
wherein the clutch carrier is rotatingly supported in the housing assembly coaxially relative to the rotational axis of the motor shaft and comprises a casing portion that forms a receiving chamber for the first and the second plate package, as well as a first cover portion and a second cover portion that laterally delimit the receiving chamber of the clutch carrier and each comprise a sleeve projection for supporting the clutch carrier in the housing assembly;

a first actuator for loading the first plate package, wherein the first actuator is arranged outside the clutch carrier and is axially supported on the housing assembly in a first direction, wherein a first force transmitting member is provided for transmitting an axial force generated by the actuator to the first plate package arranged in the clutch carrier, wherein the first cover portion comprises a plurality of circumferentially distributed first through-apertures through which cams of the first force transmitting member extend;

a second actuator for loading the second plate package, wherein the second actuator is arranged outside the clutch carrier and is axially supported on the housing assembly in a second direction, wherein a second force transmitting member is provided for transmitting an axial force generated by the actuator to the second plate package arranged in the clutch carrier, wherein the second cover portion comprises a plurality of circumferentially distributed second through-apertures through which cams of the second force transmitting member extend;

wherein the first actuator and the second actuator are controllable independently of one another by a control unit, so that a first torque transmitted from the first plate package to the first clutch hub and a second torque transmitted from the second plate package to the second clutch hub can be variably set independently of one another.

2. The electric drive according to claim 1,
wherein the clutch carrier on its outer circumference comprises an annular gear that engages an output gear of the transmission shaft, wherein the annular gear is configured so as to be integral with the clutch carrier.

3. The electric drive according to claim 2,
wherein the annular gear of the clutch carrier and the output gear of the transmission shaft comprise helical teeth.

4. The electric drive according to claim 1,
wherein the transmission unit comprises exactly one transmission shaft and two pairs of gears, wherein the input gear of the motor shaft and the input gear of the transmission shaft engaging therewith form a first gear pair and the output gear of the transmission shaft and the annular gear engaging therewith form a second gear pair.

5. The electric drive according to claim 4,
wherein a total transmission ratio of the transmission unit is between 8 and 10, wherein a first transmission ratio of the first gear pair is between 3.0 and 4.0 and a second transmission ratio of the second gear pair is between 2.5 and 3.5.

6. The electric drive according to claim 1,
wherein the electric machine comprises a greatest radius, and wherein, between the rotational axis of the transmission shaft and the rotational axis of the motor shaft, a radial distance is formed that is smaller than 0.9 times the greatest radius of the electric machine.

7. The electric drive according to claim 1,
wherein there is provided a first clutch bearing for supporting the first cover portion of the clutch carrier and a second clutch bearing for supporting the second cover portion of the clutch carrier,
wherein an outer diameter of the first clutch bearing is smaller than an inner diameter of the first actuator, and wherein an outer diameter of the second clutch bearing is smaller than an inner diameter of the second actuator.

8. The electric drive according to claim 7,
wherein the first clutch bearing at least partially comprises an axial overlap with the first actuator, and
wherein the second clutch bearing at least partially comprises an axial overlap with the second actuator.

9. The electric drive according to claim 8,
wherein the first actuator is a hydraulically operable actuator and comprises an annular first piston which is axially movably positioned in an annular first cylinder chamber of the housing assembly, wherein between the annular first piston and the first force transmitting member a first axial bearing is arranged, and
wherein the second actuator is a hydraulically operable actuator and comprises an annular second piston which is axially movably positioned in an annular second cylinder chamber of the housing assembly, wherein between the annular second piston and the second force transmitting member a second axial bearing is arranged.

10. The electric drive according to claim 8,
wherein at least one of the first actuator and the second actuator is an electromagnetically operable ramp assembly and comprises an axially supported supporting ring as well as an axially movable setting ring, wherein one of the supporting ring and the setting ring is held in a rotationally fixed way in the housing assembly, with the other one of the supporting ring and the setting ring being rotatingly drivable, wherein the supporting ring and the setting ring are axially supported relative to one another via ramp faces that are configured such that a relative rotation of the rotatingly driveable one of the supporting ring and the setting ring results in an axial displacement of the setting ring relative to the supporting ring, wherein an axial bearing is arranged between the setting ring and the associated force transmitting member of the clutch package.

11. The electric drive according to claim 1,
wherein the housing assembly comprises a first housing portion which at least partially forms a first receiving chamber for the electric machine, a second housing portion which at least partially forms a second receiving chamber for the double clutch unit, as well as at least one intermediate wall that is arranged between the first housing portion and the second housing portion,
wherein the intermediate wall comprises a first bearing receiving face for receiving a first shaft bearing for the motor shaft, as well as a second bearing receiving face for receiving a second shaft bearing for the transmission shaft, wherein a radial distance between the first bearing receiving face and the second bearing receiving face is smaller than 2.0 times a radial extension of at least one of the first and the second shaft bearing.

12. The electric drive according to claim 11,
wherein an intermediate plate is provided that is arranged between the intermediate wall and the second housing portion, wherein one of the first and the second clutch bearing as well as one of the first and the second actuator is received in the intermediate plate and is axially supported against same.

13. The electric drive according to claim 12,
wherein between the intermediate plate and the intermediate wall a receiving chamber is formed in which the driving gear of the transmission shaft is arranged.

14. The electric drive according to claim 11,
wherein the hollow shaft comprises a shaft portion connected to a rotor of the electric machine, a bearing portion rotatably supported in the intermediate wall, and the driving gear, wherein the driving gear freely projects into the receiving chamber formed between the intermediate wall and the intermediate plate.

15. The electric drive according to claim 11,
wherein between the hollow shaft and the output shaft extending through the hollow shaft there is formed an annular channel having a first mouth facing the transmission unit and a second mouth distant from the transmission unit;
wherein the intermediate plate of the housing assembly comprises a through-aperture through which the output shaft extends, wherein between the output shaft and the intermediate plate an annular gap is formed through which lubricant can flow from the receiving chamber of the double clutch unit into the annular channel.

16. The electric drive according to claim 11,
wherein the intermediate plate comprises a sleeve projection coaxially to the rotational axis and extending in the axial direction, and which engages an end recess of the hollow shaft with an axial overlap.

17. The electric drive according to claim 1,
wherein the output shaft comprises a second end portion which is remote from the transmission unit and which is supported in a bearing receiving part of the housing assembly by a shaft bearing so as to be rotatable around the rotational axis, wherein the hollow shaft extends axially into the bearing receiving part.

18. The electric drive according to claim 17,
wherein the hollow shaft is sealed by a rotary seal relative to the bearing receiving part, wherein the second mouth of the annular channel is arranged axially between the rotational seal and the shaft bearing.

* * * * *